United States Patent

[11] 3,626,498

| [72] | Inventor | Herbert Rihm<br>Ostheim, Germany |
|---|---|---|
| [21] | Appl. No. | 874,590 |
| [22] | Filed | Nov. 6, 1969 |
| [45] | Patented | Dec. 7, 1971 |
| [73] | Assignee | Honeywell G.m.b.H.<br>Frankfurt-am-Main, Germany |
| [32] | Priority | Nov. 14, 1968 |
| [33] | | Germany |
| [31] | | P 18 08 764.4 |

[54] VALVE
9 Claims, 4 Drawing Figs.

[52] U.S. Cl. ................................................. 251/261,
251/317, 251/163
[51] Int. Cl. .................................................. F16k 31/44
[50] Field of Search .......................................... 251/257,
260, 261, 252, 162, 163, 317

[56] References Cited
UNITED STATES PATENTS

| 2,267,057 | 12/1941 | Verner | 251/257 |
| 2,283,076 | 5/1942 | Mattimore | 251/257 X |
| 3,314,645 | 4/1967 | Temple | 251/317 |

*Primary Examiner*—Harold W. Weakley
*Attorneys*—Arthur H. Swanson, Lockwood D. Burton and John Shaw Stevenson

ABSTRACT: A valve having a sleeve-shaped body, a plug that has a hemispherical shaped portion that is movable in an axial direction within the inner wall of the sleeve with respect to an annular valve seat formed in the body, and an eccenter connected to a rotatable shaft and in engagement with a substantially C-shaped wall portion of the plug to simultaneously, slidably and rotatably move the hemispherical plug portion into and out of engagement with the valve sleeve during associated clockwise and counterclockwise movements of the shaft.

Inventor
HERBERT RIHM

Inventor
HERBERT RIHM

VALVE

The invention relates to types of valves that are provided with tubelike housing, a throttling plug member inside the housing which is movable in an axial direction with respect to an annular valve seat and which is of a semispheric shape on a side that faces the seat.

A valve of this general type has a throttling member which consists of two semispheric end portions and a cylindrical central portion. This throttling member is suspended in the tubelike valve housing and movable in axial direction by means of two cantilevers and can be moved within the housing by means of a crank gear. Since only the center of the throttling member is moved along a straight line but not its semispheric end portions, for a sufficient sealing between the throttling member and the seat this annular elastically deformable valve seat is borne floating in its radial plane in such a manner that the medium flowing through the valve can act inwardly onto the valve seat. The movement of the throttling member in the direction of the valve seat is limited by means of a stop. The bearing and the operation of the throttling member are rather complicated. Especially the great number of bearing points for the cantilevers is disadvantageous.

Another valve of this general type has a drop shaped closure plug member which is suspended on a swinging lever which simultaneously serves for operating the throttling member. The closure member has guiding extentions extending in opposite directions and projecting through the annular valve seat. These extentions are guided in axial-grooves of the tubelike housing and avoid turning of the closure member. Such an arrangement has the disadvantage that because of this guide in axial direction the swinging lever can only move through a small angular range in which the movement of the connection point between the swinging lever and the closure member can be deemed at approximately linear.

Finally there is a multiple way valve with a spheric closure member which with a central axial bore is positioned turnable on an eccentric shaft borne by the adjusting axle. The closure member following the eccenter shaft carries out a tilting movement by which the impinging flow becomes nonsymetric so that this construction is only suitable for valves of small diameter and with low pressure. With high diameters and pressures the forces of the flowing medium acting unsymetrically on the closure member would need relatively high reaction forces of the actuator for retaining the valve in a determined position.

It is an object of the present invention to provide a unique valve that does away with a need for cantilevers, other forms of swinging levers and the undesired crank shaft type of tilting mechanisms mentioned supra that have heretofore been employed for valve of the general type referred to supra.

It is another object of the invention to disclose a valve that employs the rotary motion of an eccenter on a rotatable shaft to directly move with ease a valve plug into a closed position with its associated seat and to a fully open position when it has been moved an appreciable distance away from this seat.

In order to avoid the disadvantage mentioned above and simultaneously to disclose a valve with a simple and rigid construction the invention starts from a construction having a throttling member which is nonturnably guided along the axis of a tubelike housing. According to the invention the improvement consists in that the essentially spheric-shaped plug member is guided by parts of the housing movably and turnably and is borne on the eccenter of an eccenter shaft which extends rectangular to the axis of the housing through that housing and which, at least, on one side passes through the wall of the housing with this portion then forming the actuator shaft. When the eccenter is turned the plug member is not only displaced in axial direction away from the valve seat or is moved in axial direction to the valve seat respectively but it simultaneously turns around an axis which is rectangular to the axis of the housing. Because of the spheric-shape of the plug member and its guiding in axial direction a completely symetric impingement of the medium is achieved through the entire stroke of the plug member.

A better understanding of the present invention may be had from the following detailed description when read in connection with the accompanying drawings in which.

Figure 2:
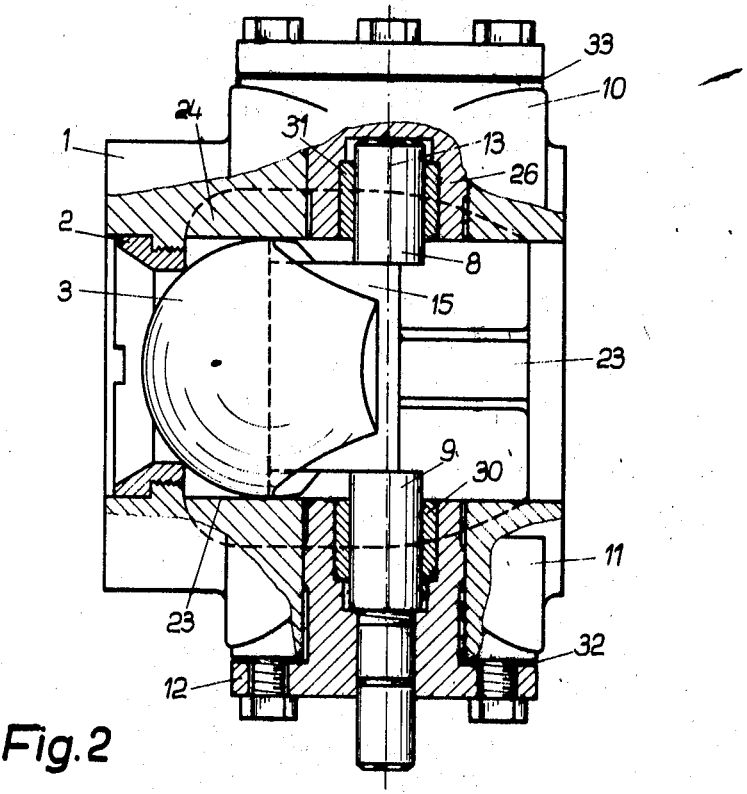
FIG. 2 shows an orthogonal sectional view along line II–II in FIG. 1 with the valve being closed.

In the essentially tubelike valve-housing 1 a seat ring 2 is screwed which cooperates with the spheric plug member 3. On that side of the closure member facing the seat ring a sealing ring 4 may be inserted into the plug member, said sealing ring being held in its position by means of a mushroom-shaped cover 5. The cap 5 is fixed to the plug member 3 by means of screws 6. The cover 5 as well as the sealing ring 4 supplement the plug member 3 to a spheric form on the side facing the seat 2. If no flexible seal is needed the plug member 3 may be one spheric piece as it is shown in FIG. 2.

An eccenter shaft 7 is borne by its bearing portions 8 and 9 in cylindrical bores of the sidewalls 10 or in bearing-housings 12 and 26 respectively. In the bearing-housings bearing bushings 30 and 31 may be provided. The bore in the bearing-housing 26 may be closed at one side and contains the portion end 8 of shaft 7. A bearing-housing 12 is mounted into the bore of the opposite wall portion 11, said bearing-housing being sealed at its outer side by means of a packing-box or packing-ring providing tight sealing of the actuator-shaft 9 projecting to the outer side of bearing-housing 12. Seals 32 and 33 between bearing-housings 12 and 26 and the wall-portions 11 and 10 of the valve-housing are provided also.

The centerline 13 of the shaft portions 8 and 9 of the eccenter-shaft 7 cuts or crosses the centerline 14 of the tubelike housing under a right angle. The eccenter 15 borne by the middle portion of the eccenter-shaft 7 has the form of a cylinder and is lying within the transverse bore 16 of the spherical plug member 3. The closure member 3 encompasses with its two shoes 17 and 18 more than half of the circumference of the cylindrical eccenter 15 by which a proper guiding and power transmission between the eccenter 15 and plug member 3 is guaranteed. The valve-housing 1 is mounted like a flapper with its inlet side 19 and its outlet side 20 between the flanges of connecting tubes by means of screws or the like. Alternatively flanges may be provided at the valve housing.

Figure 1:
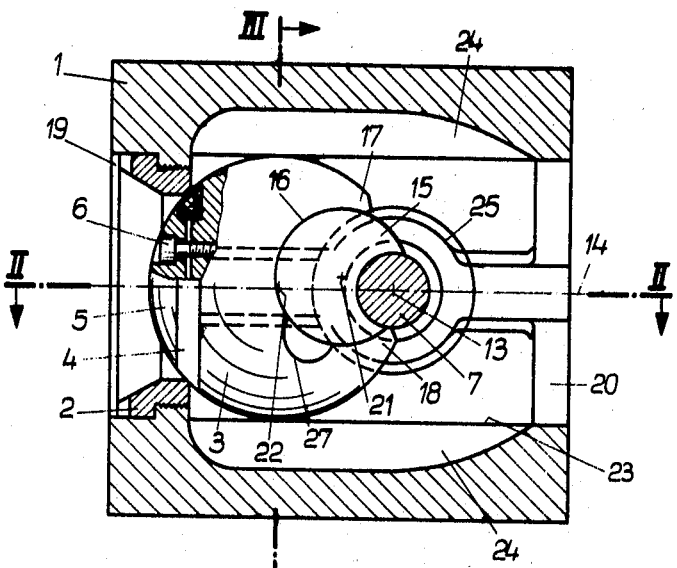
FIG. 1 shows a sectional view through the valve along the axis of the tubelike housing and at right angles to the eccenter shaft.
Figure 3:
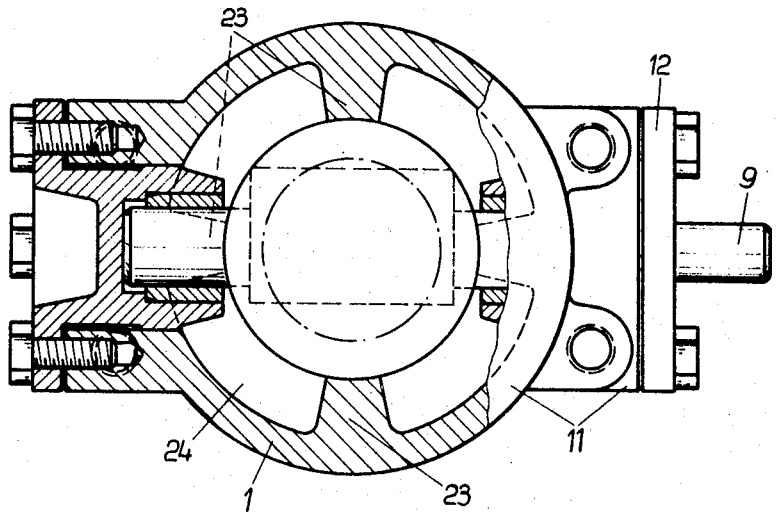
FIG. 3 shows a sectional view along line III–III in FIG. 1 through the valve housing.
Figure 4:
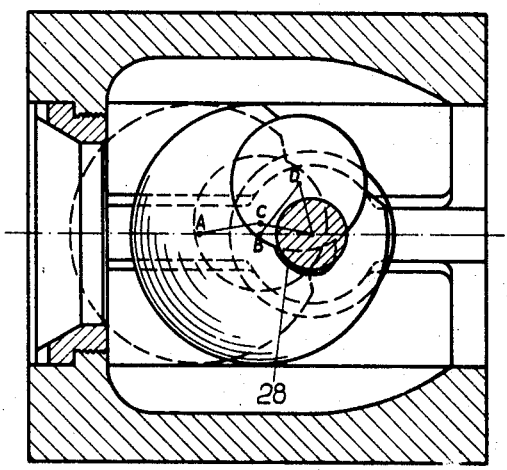
FIG. 4 shows a corresponding representation of the valve when it is opened.

From the closed position shown in FIG. 1 the valve is opened by means of turning eccenter shaft 7 in a clockwise direction with regard to FIG. 1. Herewith the centerline 21 of the eccenter 15 follows a circular arc around the centerline 13 of bearing ends 8 and 9 of the eccenter-shaft. At the end of the stroke the eccenter 13 is in the position as shown in FIG. 4. During this movement the plug member 3 on the one side is removed from the valve seat 3 in the direction of centerline 14 of the housing and on the other side is turned in anticlockwise direction around its center 22. The plug member 3 is guided in direction of axis 14 by means of ribs 23 which are equally spaced around the inner circumference of housing 1. The plug member 3, therefore, cannot change its position in radial direction so that during the turning movement of the eccenter and the radial displacement of the eccenter the plug member 3 is positively turned in anticlockwise direction. As can be seen from FIG. 3 the ribs 23 are spaced by 90° around the circumference of the tubelike housing. Instead of this there may be only three or more than four of such ribs. Between the ribs there are provided streamlined pockets 24, the cross section of which is chosen such that there total cross section between the valve seat 2 and the plug member 3 if the valve is completely opened. In order to keep the flow resistance of the valve as low as possible also the wall portions of the tube before and behind of the bearing portions of the eccenter shaft are formed streamlined. In FIG. 1 the surrounding line 25 of bearing portion 26 for shaft end 8 is shown partially in dotted lines. In a similar manner also the opposite wall of the tube is formed in the area of the bearing for actuator shaft 9.

During the opening movement of the valve the center 22 of the plug member 3 travels along the axis 14 of the housing 1 from point A to point B. Simultaneously the center 21 of eccenter 15 travels along a circular arc from point C to point D. As can be seen, point C, that means the center of the eccenter, does not lie on the centerline 14 of the housing when the valve is closed. The valve, therefore, is closed shortly before the eccenter reaches the dead-point position. Therefore, with relatively small forces at the eccenter-shaft 7 the valve can be kept closed against high differential pressures between inlet 19 and outlet 20. The spheric form of the closure member ascertains a favorable flow characteristic within the valve so that cavitation and its consequences are avoided. Additionally the construction and the assemblage of the valve a very simple.

In order to allow the lower shoe 18 of the plug member 3 to pass parts 8 and 9 of the eccenter-shaft 7 in the area between the eccenter 15 and the walls 10 and 11 of the housing during the movement of plug member 3 from the closed position as shown in FIG. 1 into the open position as shown in FIG. 4 the lower shoe 18 is cutaway in this area long line 27. The end portion 28 of this line simultaneously serves as an abutment for limiting the stroke of the plug member 3 (see FIG. 4).

The actuator shaft 9 for the closure member can be turned manually or by means of a suitable electrical, pneumatic, or other actuator. The valve because of its good flow conditions has favorable control characteristics.

The embodiments of the invention in which an exclusive property or privilege is claimed are defined as follows:

1. A valve comprising an elongated body having a seat therein, a plug having a substantially hemispherical shaped portion at one end supported for axial movement along the longitudinal axis of the body toward and away from said seat, a recessed wall portion forming an arc of a circle in an end portion of the plug that is opposite to said first end, a shaft supported for rotation in the body, an eccenter fixed to and extending away from a side portion of the shaft, said eccenter having an outer cylindrical shaped surface retained for sliding rotatable moving engagement within the entire arcuate shaped wall forming the recess in said plug, said last mentioned movement of said eccenter being operable to affect slidable and rotatable movement of the plug along said longitudinal axis of the body into and out of engagement with said seat as said shaft and the eccenter is rotated respectively as a single unit in associated clockwise and counterclockwise directions.

2. The valve defined in claim 1 wherein the wall portion forming the aperture in the plug is of a cylindrical shaped configuration and wherein the last mentioned wall portion encompasses more than half of the outer surface of the eccenter.

3. The valve defined in claim 1 wherein the eccenter extends into the wall portion forming the aperture in the plug to a position that is substantially at the middle portion of the plug.

4. The valve defined in claim 1 wherein the seat is of an annular shaped configuration and an annular seal is retained in an outer wall of the hemispherical plug for engagement with the annular seat.

5. The valve defined in claim 1 wherein the seat is of an annular shaped configuration, an annular seal is retained in an outer wall of the hemispherical plug for engagement with the annular seat, and wherein the seal is positioned between two portions which form said plug and a removable connecting means is employed to retain the seal between said two plug portions.

6. The valve as defined in claim 1 wherein the inner surface of the body has a plurality of spaced apart ribs and passageways formed between the ribs, and said ribs being operable to guide the plug along said longitudinal axis of the body while it is rotatably moved by the rotation of the eccenter toward and away from its associated seat.

7. The valve as defined in claim 1 wherein the inner surface of the body has a plurality of spaced apart ribs and passageways formed between the ribs, said ribs being operable to guide the plug along said longitudinal axis of the body while it is rotatably moved by the rotation of the eccenter toward and away from its associated seal and wherein the total sum of the cross sectional area of the passageways formed by the inner wall of the body is at least equal to the space formed between the plug and its seat when the plug is in a fully opened position.

8. A valve as defined in claim 1 wherein said wall portion of the plug forming the aperture in the plug is of a characteristically shaped construction to avoid contact with said shaft while said plug is rotated from a fully closed to a fully opened position.

9. A valve defined in claim 1 wherein said wall portion of the plug forming the aperture in the plug is of a characteristically shaped construction to avoid contact with said shaft while said plug is rotated from a fully closed to a fully opened position and wherein a portion of the characteristically shaped construction of the plug provides a stop to prevent additional movement of the plug when the plug has been moved completely away from the seat and into a fully opened position.

* * * * *